Dec. 30, 1969  G. J. CARLSON  3,486,378
TOOL SURFACE TEMPERATURE MEASURING APPARATUS
Filed April 21, 1967  3 Sheets-Sheet 1

Inventor:
Gerald J. Carlson,
by Louis A. Moucha

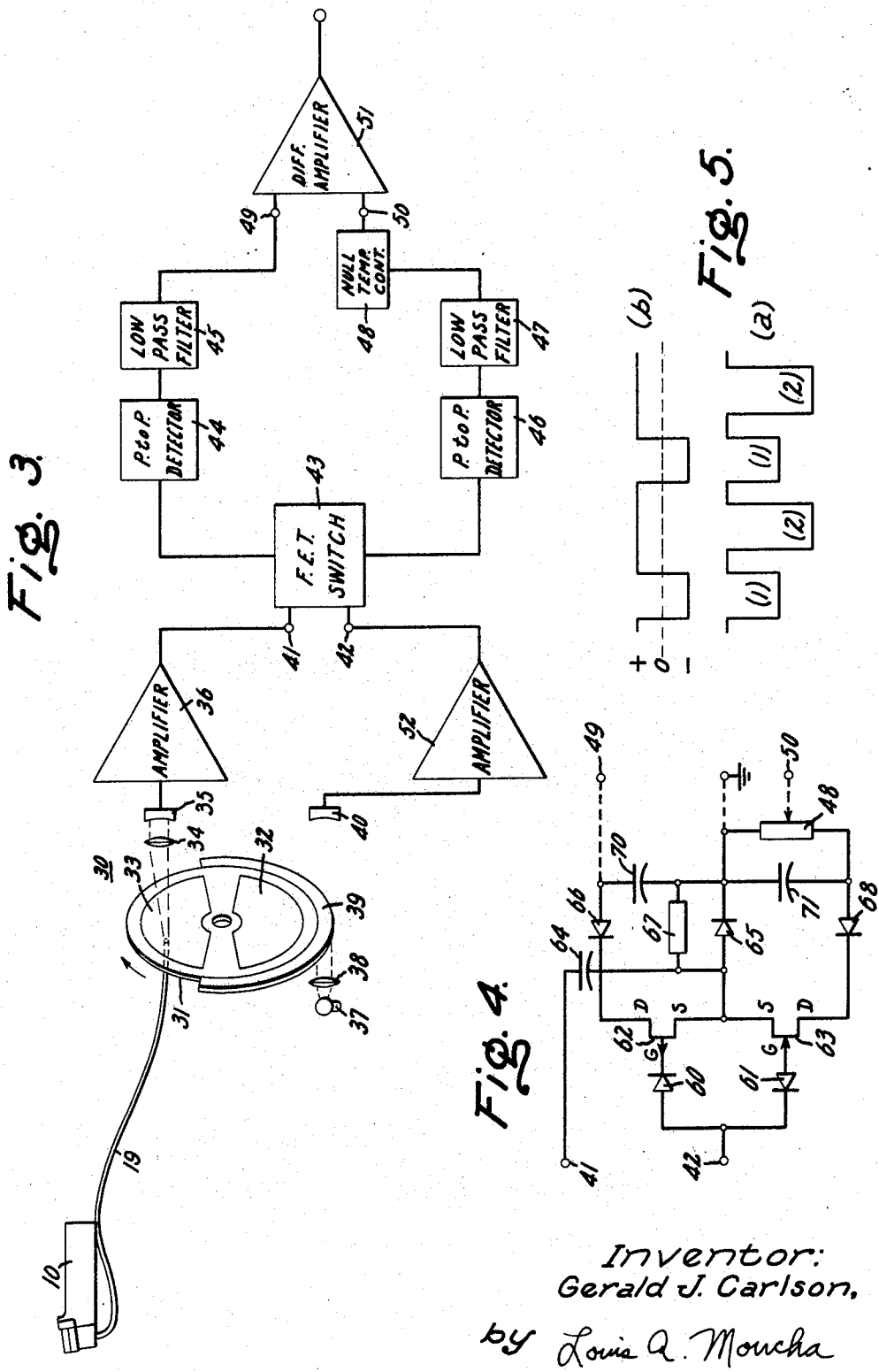

Dec. 30, 1969  G. J. CARLSON  3,486,378
TOOL SURFACE TEMPERATURE MEASURING APPARATUS
Filed April 21, 1967  3 Sheets-Sheet 3

Inventor:
Gerald J. Carlson,
by Louis A. Moncha

3,486,378
TOOL SURFACE TEMPERATURE MEASURING APPARATUS

Gerald J. Carlson, Scotia, N.Y., assignor to General Electric Company, a corporation of New York
Filed Apr. 21, 1967, Ser. No. 632,621
Int. Cl. G01k 1/08, 7/00
U.S. Cl. 73—343                                9 Claims

ABSTRACT OF THE DISCLOSURE

Opto-electronic apparatus for hot spot temperature measurement by indirect viewing of a heated surface of a cutting tool through a small diameter hole therein which terminates close to the hot spot surface. A first end of a light guide within the hole views the radiant energy emitted from the heated end surface of the hole during a cutting operation and the remote second end directs the radiant energy to a ratio pyrometer comprising a rotating disc, two infrared filters and a first photocell. The photocell output is a series of electrical pulses of first and second amplitude representing the intensity of the radiant energy in the two spectral bands determined by the filters. Opto-electronic circuitry separates the pulses into two separate pulse trains comprising the first and second amplitude pulses, detects, and compares the peak amplitude of the pulses to obtain a ratio of pulse amplitudes. The hot spot temperature is determined from a known correlation of temperature versus pulse amplitude ratio.

---

My invention relates to sensor apparatus for determining the temperature of the surface of a body generally inaccessible to conventional temperature measuring apparatus, and in particular, to an improved tool insert and tool surface temperature measuring apparatus for continuous and fast response determination of the hot spot temperature of a cutting tool during a cutting operation.

The useful life of machine tools, and in particular, cutting machine tools for use in lathes, milling machines and the like is determined to a great extent by the maximum temperature attained by the cutting tool during a machining operation which for purposes of simplification will be described hereinafter as a cutting operation. This maximum temperature, in general, does not occur at the cutting edge, but rather at a small spot (conventionally designated the "hot" spot) on the surface of the tool displaced from the cutting edge in the region where the chip leaves the tool-chip interface during a cutting operation. Thus, maintenance of the hot spot temperature at a predetermined value which is a function of many machining variables including cutting speed and feed rate is an important goal in this application. The tool temperature is maintained constant during cutting at a value typically 1400° F. for carbide cutters by continuously controlling the machine cutting speed or feed rate from the electrical output of the temperature sensing apparatus. The tool operating temperature is chosen as an economic compromise between machine productivity and tool life.

Measurements of the hot spot temperature, however, is often difficult since such small area is generally inaccessible to conventional temperature measuring apparatus and radiation type detectors are often hampered by poor optical paths due to the interference of chips and cutting fluids. Hot spot temperature measurement is especially important in adaptive controls for automatic machine tools wherein the more sophisticated adaptive controls not only improve the productivity of the machine, but also improve the quality of the part being machined thereby. These adaptive controls require continuous temperature measurement at a fast response time in order for the machine to adapt itself to the changes for which it is programmed.

The conventional method for measuring the tool-chip interface temperature of a machine tool employs the tool-to-work junction as a thermoelectric couple and correlates the electromotive force produced across the junction during the cutting operation to temperature. Under controlled conditions, this method is relatively accurate for single point cutting tools but inaccurate for multiple point tools because the temperature measured tends to be the average over the total contact region and thus does not measure the hot spot temperature. However, in either case the method is difficult to apply in a practical cutting operation partly due to the need for electrical isolation of the tool, the workpiece, or both. Additional disadvantages of the tool-to-work thermocouple method are (1) the output EMF versus temperature relationship is a function of tool and work materials requiring calibration, (2) the EMF is characteristically of small value and noisy during cutting and (3) slip rings must be employed where rotating cutters are used, being especially important is adaptive controls for automatic machine tools.

In recent years, radiation pyrometry has developed into a valuable tool for temperature measurement. One of the classes of radiation pyrometers known as a ratio pyrometer determines temperature as a function of the radiation in two spectral bands selected by the particular two filters employed in the pyrometer. Another device associated with radiant energy, and especially in the visible and near visible wavelengths, is the light guide (also described as a light pipe) which is an optical device comprised of a bundle of optical fibers for transmitting by total internal reflection any optical radiant energy incident upon an end thereof.

Therefore, one of the principal objects of my invention is to proivde an apparatus for determining the temperature of a selected surface area on a body generally inaccessible to conventional temperature measuring apparatus.

Another object of my invention is to provide an opto-electronic means for producing a null-balanced output temperature sensing apparatus suitable for temperature control applications.

A further object of my invention is to provide an apparatus for continuous, fast response temperature measurement of the hot spot on a cutting tool.

A still further object of my invention is to provide an improved tool insert and electronic circuit adapted for use with my temperature measurement apparatus.

Briefly summarized, my temperature measuring apparatus comprises an optical fiber device for transmitting radiant energy emitted from a hot body surface area the temperature of which is to be determined, and a ratio pyrometer in optical communication with the second end of the optical fiber device for converting the radiant energy incident upon the optical fiber device and transmitted therethrough into a series of electrical pulses of first and second amplitude representing the intensity of the incident radiant energy in two spectral bands thereof. Electronic circuitry in the ratio pyrometer determines the ratio of the pulse amplitudes and generates a null-balanced output from which the temperature of the selected surface area is continuously determined with a fast response time of approximately 0.20 second. In applications where it is not feasible to directly view the heated surface, the first end of the optical fiber device is inserted into a small diameter hole extending into the body whose external surface temperature is to be determined, the hole terminating in close proximity with such surface. In the specific case of a machine tool cutting member, such as a tool insert, the end of the hole is located in the region of the tool-chip interface to measure the hot spot temperature. One or a plurality of holes may be utilized as determined by the type of tool insert. Location of the first end of the optical fiber device within the small diameter hole provides isolation of the temperature measuring apparatus from any contaminants produced by the hot body.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings wherein like parts in each of the several figures are identified by the same character reference and wherein:

FIGURE 3 represents, partly in block diagram form, my temperature measuring apparatus including the light guide portion shown in FIGURES 1 and 2;

FIGURE 4 is a schematic diagram of the electronic circuitry included between the amplifiers and differential amplifier shown in FIGURE 3;

FIGURE 5 illustrates the waveforms of the signals supplied to the input terminals of the circuit of FIGURE 4;

Figure 1:
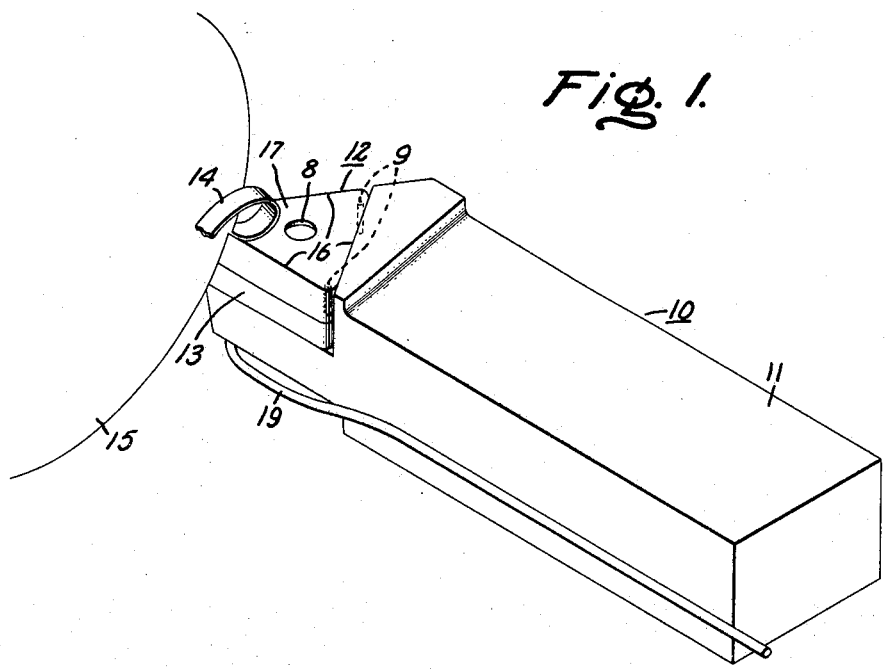
FIGURE 1 is a perspective view of a cutting tool member and a light guide associated therewith in accordance with my invention.
Figure 2:
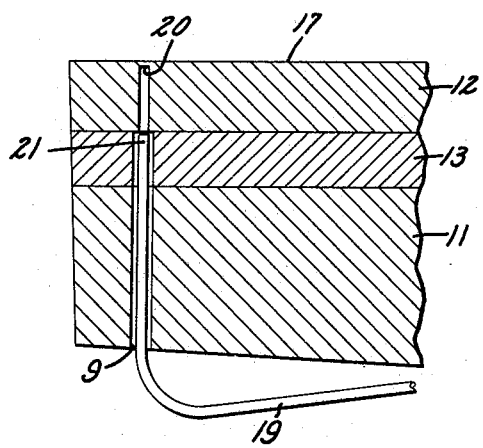
FIGURE 2 is a sectional view through one of the small diameter holes extending into the cutting tool member illustrated in FIGURE 1 and indicates the position of the light guide therein.

Referring now to FIGURES 1 and 2, there is shown the cutting tool member designated as a whole by numeral 10 of a machine tool wherein member 10 is comprised of a tool holder 11, the cutting tool insert 12 and a seat 13 therefor. Tool member 10 may be of a design similar to the Carb-O-Lock, a trademark of the General Electric Company for a cutting tool, manufactured by the Metallurgical Products Department of the General Electric Company at Detroit, Mich. An important distinction between the prior manufactured tool member and my tool member 10 which forms the basis of one aspect of my invention is the structure of the tool insert body 12. My tool insert is provided with one or more small diameter holes 9 which are formed through the bottom (as viewed in FIGURES 1 and 2) surface of insert 12 and terminate in close proximity with the external (top) surface 17 including the cutting edges 16 and commonly described as the face. The Carb-O-Lock tool insert does have a large diameter, centrally located hole 8 passing completely through the insert, but this hole and a pin passing therethrough and into the tool holder is a locking means for the insert. The structure of my novel insert with the hole or holes 9 therein makes it particularly adaptable for use with a temperature sensing apparatus to be described in detail hereinafter.

Tool member 10 is illustrated in a cutting operation in FIGURE 1 wherein a chip 14 is being removed from a workpiece 15 by a cutting edge 16 of the tool insert due to relative motion between the cutting edge and the workpiece. As is well known, removal of material from a workpiece is not by cutting but by shearing action as the material deforms by shear along a narrow zone extending from the cutting edge of the tool along the workpiece surface. The material lying ahead of the tool as it reaches the shear plane is displaced by shear to form the chip which then slides along the face of the tool and away from the cutting area. Two of the primary sources of heat generation in the process of chip formation are (1) along the shearing plane due to plastic deformation of the material and (2) along the tool-chip interface due to frictional heat. The amount of heat generated varies with cutting speed and feed rate, generally increasing with both but at different rates. Thus, in adaptive controls for automatic machine tools both the cutting speed and feed rate provide means for adjusting and controlling the tool temperature to be at a maximum consistent with useful tool lifetime and quality of parts being machined. During chip formation, heat is continually removed from the region of the cutting edge of the tool by the chip and as a result the cutting edge is not the hottest point of the tool as might be expected. Similarly, the tool-chip interface temperature is not uniform along the contact surface and the point of highest temperature is some distance from the cutting edge. The location of this "hot spot" (and end 20 of hole 9) is in the region where the chip leaves the tool insert face (approximately .05 to .10 inch from the cutting edge) and another aspect of my invention is directed to determining such hot spot temperature.

The temperature of a heated surface is determined in accordance with my invention by viewing such surface, directly if possible, or indirectly, by means of a light guide and transmitting the radiant energy emitted from the heated surface to a ratio pyrometer which includes suitable circuitry to be described in detail hereinafter. In the specific application of a cutting tool, the hot spot is viewed indirectly by means of the small diameter hole(s) 9 formed into the cutting tool extending through tool holder 11, seat 13 and into tool insert 12 terminating in close proximity with the hot spot on the particular external surface 17 which includes the tool-chip interface and active cutting edge 16. In one particular application, the hole within tool insert 12 has a diameter of .035 inch and extends to within .010 inch of surface 17. In similar typical applications, the hole diameter in insert 12 can be in the range of .020 inch to .100 inch and the hole can extend to within a range of .005 inch to .020 inch of surface 17. In my work I have found the conventional electrical discharge machining processes to be a convenient method for forming these small diameter holes in hard materials such as carbide cutters. Although a triangular tool insert 12 is illustrated in FIGURE 1, it is to be understood that my invention is not limited to such shaped tool insert, but is applicable to any cutting tool, the hot spot temperature of which is to be determined. Also, my invention is not limited to cutting tool applications, and can be utilized in measuring the temperature of any heated surface, in the latter case the viewing holes 9 not necessarily being required as determined by the environment.

In the application of my invention to cutting tools, and in particular to cutting tool inserts 12 such as illustrated in FIGURE 1, it has been found convenient to locate the centers of holes 9 along bisectors of the angles defined by the intersection of adjacent side surfaces of the insert since at least the end part of a cutting edge 16 is used in almost all cutting operations. The orientation of holes 9 may be perpendicular to face 17 or at some other angle thereto, the latter orientation being especially useful for tool inserts having cutting edges along both the top and bottom surfaces to thereby prevent intersection of the holes directed through both surfaces. Although the same diameter hole 9 within tool insert 12 may pass through seat 13 and tool holder 11, my preferred embodiment utilizes a slightly larger diameter hole through seat 13 and holder 11, as illustrated in FIGURE 2, in order to compensate for any misalignment between elements 11, 12 and 13 and also to restrain light guide 19 from the hottest region immediately adjacent end surface 20 of the hole in insert 12 which might damage the optical fibers comprising light guide 19.

It should be noted that insert 12 can be rotated (and even inverted) about the axis of the center hole 8 to bring a new cutting edge 16 in proximity with the workpiece 15 whereas seat 13 and tool holder 11 remain fixed. Thus, in general, it is necessary to utilize only one hole 9 through seat 13 and holder 11 to obtain registration with the particular hole 9 insert 12 then being utilized for temperature sensing.

Light guide 19 comprises a plurality or bundle of flexible optical fibers having a first end 21 positioned at approximately the interface of insert 12 and seat 13 and a second end preferably remote from the cutting tool. First end 21 of light guide 19 may be retained within the tool member 10 by an suitable means. A further advantage in locating the first end of light guide 19 outside the hole portion within tool insert 12 is the avoidance of interference during any tool insert substitution or rotation thereof. In typical applications, the diameter of light guide 19 may be in the range of .03 to .10 inch.

Referring now to FIGURE 3, light guide 19 is employed to transmit the radiant energy emitted from the hot end surface 20 of hole 9, which is in close proximity with the hot spot on face 17, to a ratio pyrometer located remote from the cutting tool. The ratio pyrometer designated as a whole by numeral 30 comprises in part a rotatable disc 31 containing first and second infrared radiation filters 32 and 33, respectively. Each of the filters occupies a section of the disc face approaching one half the area thereof and transmit radiation at a slightly different infrared wavelength. The two filters are chosen to accommodate the required range of temperature. For instance, a range of temperature from 700° F. to 2000° F. can be measured with filters having transmission bands of 1.3–1.8 microns and 1.8–2.1 microns, respectively, when a conventional lead sulfide photocell is employed.

The photocell 35 output signal is comprised of first and second amplitude pulses derived from the two filters respectively. These pulses are then electronically separated, compared and made equal at a desired tool hot spot temperature and are unequal at any other temperature. Thus, in the case of adaptive controls for automatic machine tools, a servo network can be used to control the machine for operation at or within a narrow band of temperatures about the desired temperature. The second end of light guide 19 is positioned to direct the radiation transmitted through the light guide toward a region on the rotating disc 31 which is approximately centrally located with respect to the filters rotating thereby. The radiation emitted from end surface 20 of hole 9 in tool insert 12 and incident upon first end 21 of light guide 19 is thus transmitted through the light guide and alternately viewed through infrared filters 32 and 33 by an opto-electronic portion of the ratio pyrometer comprising focussing lens 34 and photoelectric cell 35.

The use of a ratio or "two color" radiation sensor has the advantage over a total radiation sensor in that it is not sensitive to surface emissivity changes so long as the emissivity at the two filter wavelengths is the same. Also, a single photoelectric detector 35 measures radiation through two filters to obtain a ratio output relatively insensitive to changes in photodetector sensitivity. This advanage is evident from tests wherein heat applied to the photocell reduced its sensitivity by approximately a 10:1 ratio while the output voltage ratio of the photocell remained constant. Another advantage of the ratio sensor is that the alignment of the photodetector, light guide and target viewed by the first end of the light guide is not critical since a misalignment merely changes the magnitude of the signal through the filters but not the ratio between them. The size of the target is also not critical because again this merely causes a change in the magnitude of the signal and therefor my invention is well adapted for use with a variety of heat sources. Finally, the ratio sensor tends to read the highest temperature of the target as opposed to the total radiation type sensor which receives a sum total radiation from all of the temperature zones of the target and thus indicates a lower temperature.

The signals at the output of photocell 35 comprise a series of electrical pulses of alternate first and second amplitude representing the intensity of the light guide amplitude radiant energy in the two spectral bands defined by filters 32 and 33. The first (1) and second (2) amplitude pulses are considered to be of unequal amplitude as illustrated in FIGURE 5(a). An electronic amplifier 36 of conventional construction amplifies the output of photocell 35 to a sufficient level for utilization in a pulse separating circuit of the ratio pyrometer.

The pulse separating circuit is employed to separate the first and second amplitude pulses at the output of amplifier 36 as shown in FIGURE 5(a) into separate first and second pulse trains containing the first and second amplitude pulses, respectively. The pulse separating circuit includes a light source 37, focussing lens 38, a light intercepting member 39 arranged along the periphery of disc 31 and a second photocell 40. Light intercepting member 39 has its two ends aligned with the two radial lines defining the ends of filter 33 but these ends may also be anywhere in the region between the radial lines defining the ends of filters 32 and 33. Elements 37, 38, 39 and 40 are conventional components in optical alingment such that rotation of disc 31 generates a series of time reference electrical pulses at the output of photocell 40 in synchronism with the series of first (1) amplitude pulses at the output of photocell 35 as illustrated in FIGURE 5(b). A second amplifier 52 of conventional design amplifies the time reference pulses to a sufficient level for utilization in a switching portion of the pulse separating circuit. The switching means 43 may comprise any of a number of switching circuits, an electronic circuit employing field effect transistors (FET) being indicated as one example. The outputs of amplifiers 36 and 52 are shown connected to terminals 41 and 42, respectively. The switching means 43 has a first output connected to a first peak-to-peak (P to P) electronic detector circuit 44 which in turn is connected to a first low pass filter 45, and has a second output connected to a second peak-to-peak detector 46 which is connected to a second low pass filter 47. The output of the second low pass filter 47 is connected to a null temperature control 48 to be described in greater detail hereinafter. The outputs of first low pass filter 45 and null temperature control 48 are shown connected to terminals 49 and 50, respectively. Terminals 49 and 50 are connected to two inputs of a conventional electronic differential amplifier 51 the output of which may be nulled by means of null temperature control 48. A convenient simple circuit for accomplishing all of the functions of elements 43 through 48 between terminals 41, 42 and terminals 49, 50 is illustrated schematically in FIGURE 4 wherein the FET switch 43 comprises oppositely poled diodes 60 and 61 and field effect transistors 62 and 63. A common input circuit to the FET switch and to the first and second peak-to-peak detectors comprises capacitor 64, diode 65 and resistor 67. The first peak-to-peak detector circuit 44 is comprised by capacitor 64, diodes 65 and 66, resistor 67, and capacitor 70, and the second peak-to-peak detector 46 by capacitor 64, diodes 65 and 68, resistor 67 and capacitor 71. Low pass filter circuit 45 is comprised by capacitor 70 and the input impedance of the differential amplifier 51 across input terminal 49 and ground. The second low pass filter circuit 47 is comprised by capacitor 71, null temperature control potentiometer 48 and the input impedance of different amplifier 51 between terminal 50 and ground.

The operation of the circuit illustrated in FIGURE 4 may be briefly summarized as follows. Assume the first and second amplitude pulses of FIGURE 5(a) are supplied to terminal 41 and the time reference pulses of FIGURE 5(b) supplied to terminal 42 in the time sequence indicated wherein the time reference pulses are in synchronism with the first amplitude pulses of FIGURE 5(a). During the time interval of a time reference pulse (i.e. the voltage of waveform 5(b) is negative), diode 60 in reverse biased causing maximum conduction of the P-channel of FET 62 since its gate-to-source voltage is zero. This allows current to flow through FET 62 and diode 66, rapidly charging capacitor 70 to the voltage appearing across resistor 67 which at this time is the negative peak voltage of amplitude peak (1) of waveform 5(a) introduced at terminal 41. Any positive voltage appearing at terminal 41 is clamped to ground potential by means of capacitor 64 and diode 65. At the same time, diode 61 is forward biased causing minimum conduction in the N-channel of FET 63 and preventing any flow of current through FET 63 and to capacitor 71. The situation is reversed with respect to FET's 62 and 63 when the voltage of waveform 5(b) is positive. Then, the N-channel of FET 63 is conducting and the P-channel of FET 62 is nonconducting. During this time, capacitor 71 is charged toward the negative peak (2) of waveform 5(a) which appears across resistor 67. Thus, capacitors 70 and 71 are only charged from the negative peak voltage (1) and (2), respectively, of waveform 5(a). Since the FET impedance in the nonconducting mode is very high, capacitors 70 and 71 will not discharge through the FET's. The long R-C discharge time constants of low pass filters 45 and 47 are determined by capacitor 70 and the input impedance of differential amplifier 51 across terminal 49 and ground and by capacitor 71, null temperature control potentiometer 48 and the input impedance of differential amplifier 51 across terminal 50 and ground, respectively, and determine the dynamic response of the peak-to-peak detectors to change in hot spot temperature. Each FET is designated with its source electrode S, drain electrode D and gate electrode G.

The operation of my apparatus illustrated in FIGURE 3 may now be described. The first end 21 of light guide 19 is inserted into the small diameter hole 9 of the cutting tool member 10 and the second end of the light guide, and ratio pyrometer 30 including associated opto-electronic circuitry are located remote from the cutting tool. The first end of the light guide views the hot end surface 20 of the small diameter hole which is in close proximity with the tool insert hot spot and the radiant energy emitted from such end surface is incident upon end 21 of the light guide. A broad spectrum of such radiant energy as determined by the temperature of surface 20 and the characteristics of the particular optical fibers of light guide 19 is transmitted through the light guide to the second end thereof. Photocell 35 of ratio pyrometer 30 converts the radiant energy transmitted through the light guide into a series of electrical pulses of alternate first and second amplitude representing the intensity of the transmitted radiant energy in two spectral bands determined by the two infrared filters 32 and 33. The opto-electronic circuit comprising elements 37 through 40, 43 and 52 separates and supplies the series of alternate first and second amplitude pulses at the output of amplifier 36 into first and second trains of pulses having the first and second amplitudes, respectively, and supplies such trains of pulses to the respective input of the first and second peak-to-peak detector circuits 44 and 46. The peak-to-peak amplitudes of the pulses comprising the first and second trains of pulses are converted to DC (direct current) voltages of magnitude equal to the amplitudes of the first and second trains of pulses respectively in the combination of peak-to-peak detector circuits 44 and 46, and low pass filters 45 and 47, respectively, and these DC voltages are compared in differential amplifier 51.

The output of differential amplifier 51 is null-balanced by means of null temperature control potentiometer 48. The function of potentiometer 48 is to adjust the magnitude of the DC voltage at the output of low pass filter 47 to be equal to the output of filter 45, that is, to have the voltages at terminals 49 and 50 be equal. Since the outputs of the two low pass filters can only be equal at one particular temperature (not necessarily the hot spot temperature or even the temperature to be maintained and controlled) for two different infrared filters 32, 33, it follows that the potentiometer 48 setting required for a null-balance of differential amplifier 51 is a function of the ratio of the intensity of the light guide transmitted radiant energy in the two spectral bands determined by the two infrared filters 32, 33. The ratio of intensity of transmitted radiant energy has a known correlation with temperature of the surface (hole end 20) viewed by light guide 19. Thus, the setting of potentiometer 48 can be calibrated directly in terms of temperature. Further, since the temperature change between the surface 17 containing the hot spot and surface 20 can be accurately estimated for the particular tool insert material employed, the setting of potentiometer 48 can be calibrated directly for such material and particular spacing of surface 20 to surface 17. Alternatively, the setting of potentiometer 48 can be read and the temperature interpreted from suitable calibration curves of potentiometer setting versus hot spot temperature for the selected tool insert material and surface 20–17 spacing being employed in the particular cutting operation.

Figure 6:
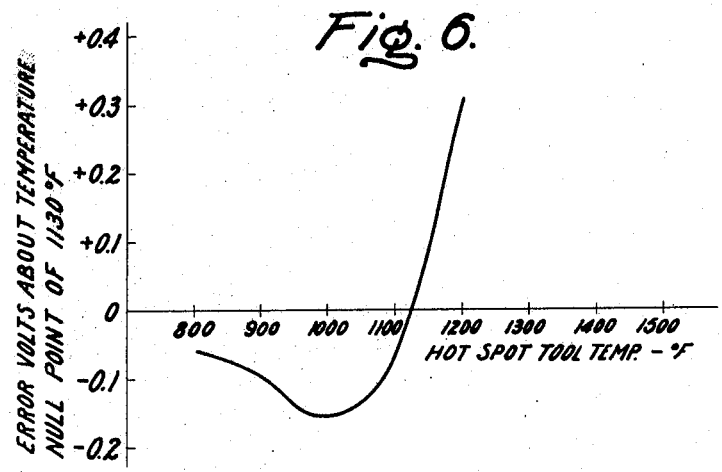
FIGURE 6 illustrates the voltage output-temperature characteristics for a particular null temperature and embodiment of my apparatus illustrated in FIGURE 3.

It should be noted that FIGURE 6 is not a characteristic curve of voltage-temperature relationship as a means to measure temperature, but is merely the characteristic of an "error" voltage in the vicinity of the null-balance of differential amplifier 51 which defines the desired operating temperature. Thus, in the case of FIGURE 6, the curve illustrates the error voltage in the vicinity of the desired operating temperature of 1130° F. A function of an adaptive control servo loop is to control machine speed or feed rate to maintain a desired tool (hot spot) temperature, the particular error characteristic curve of FIGURE 6 represents the error voltages generated at the output of my apparatus (output of differential amplifier 51) when maintaining the hot spot temperature at 1130° F. For cutting operations at this 1130° F. temperature, the setting of potentiometer 48 is kept fixed. The response time of my temperature measuring apparatus is approximately 0.2 second and is limited primarily by the response time of the photocells and the speed of the rotating disc which in one application is in the order of 30 revolutions per second. The response time for changes of temperature in the hot spot to reach end surface 20 of hole 9 is also in the order of 0.2 second and thus the hot spot of the cutting tool can be measured with a fast response time as low as 0.2 second.

The type of optical fibers and photocells employed in my apparatus are determined by the expected temperature range of operation. Thus, glass fibers are conveniently employed to transmit radiant energy over the range of wavelengths from 0.4 to 2.0 microns whereas fibers of quartz are employed over the longer range of wavelengths from 0.2 to 3.8 microns. The choice of photodetectors is influenced by their spectral response characteristics, sensitivity and stability. The spectral response must match the emission spectra from the tool insert over the temperature range of interest and also the transmission characteristics of the light guide. Thus, photodetectors suitable for use with the glass fiber light guide are the types constructed from gallium arsenide and cadmium sulfide as two examples, whereas photodetectors suitable for operation with quartz fibers are constructed from lead sulfide and indium arsenide. There is a considerable overlap in the spectral response of the various photodetectors and the optical fibers such that a temperature measurement apparatus in accordance with my invention may employ conventional glass fibers and lead sulfide cells as probably the best low cost choice over the temperature range of 700° to 2000°

Farenheit. While the use of glass does limit the sensor to 700° F. this is not considered a disadvantage since tools attain temperatures considerably higher than 700° F. when cutting efficiently. If temperatures lower than 700° F. have to be measured, quartz fibers are employed instead of the glass fibers.

Figure 7:
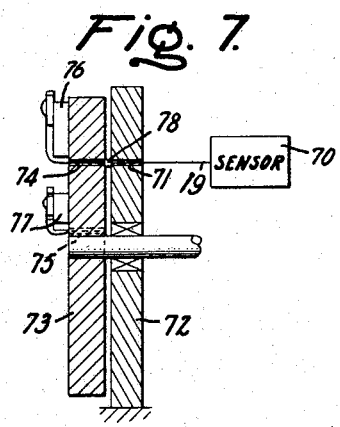
FIGURE 7 is a view, partly in section, of an application of my invention to the indexed cutting head of an automatic turret lathe.

FIGURE 7 illustrates an application of my tool surface temperature measuring apparatus for measuring the hot spot temperature of indexed cutting tools of a turret lathe. The temperature measuring apparatus excluding the light guide is illustrated in block diagram form as sensor 70. Light guide 19 is secured within and passes through a single hole 71 in a member 72 fixed to the carriage of the lathe. Turret head 73 of the lathe is provided with a plurality of holes 74 and 75 associated with the particular tool holders 76 and 77, respectively. The portions of the light guide in communication with each tool are secured within and pass through holes 74 and 75. An air path coupling 78 is provided intermediate member 72 and turret head 73 such that upon rotation of head 73 in changing from one tool to another, the particular light guide associated with the active cutting tool will be in registration with the part of the light guide passing through hole 71 in member 72.

Figure 8:
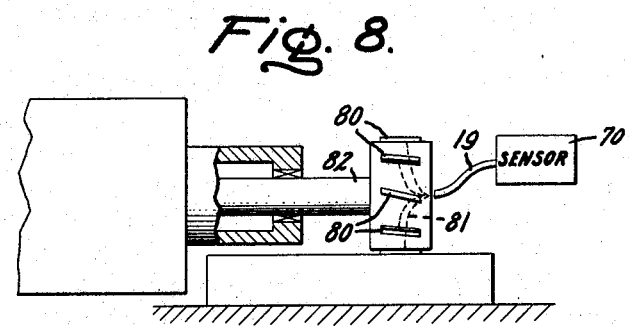
FIGURE 8 is an illustration of an application of my invention to the cutters of a milling machine.

Another application of my tool surface temperature measuring apparatus is illustrated in FIGURE 8 wherein the cutters 80 of a milling machine are each provided with a light guide 81 brought to a common point along the centerline axis of the rotating shaft 82. At this common point an air path coupling is used to align these light guides with a single light guide 19 connected to the temperature measuring apparatus 70, and in particular, is directed at the infrared filters of disc 31.

From the foregoing description, it can be appreciated that my invention attains the objectives set forth and makes available an improved tool insert, electronic circuit, and a tool surface temperature measuring apparatus for continuous and fast response determination of the hot spot temperature of a cutting tool during a cutting operation. The combination of the light guide and opto-electronic circuitry in a ratio pyrometer is also useful for continuous and fast response measurement of the temperature of any surface directly viewed by the light guide.

Having described my invention, it is belived obvious that modification and variation of my invention is possible in the light of the above teachings. Thus, various diameter holes may be employed in many orientations with respect to the hot spot surface to be measured, the only requirement being that the viewing hole terminates in close proximity with the hot spot surface. Further, member 31 need not be a rotating disc, but can be a reciprocating member in which case filters 32, 33 would be of smaller size than when employing a rotating disc. In fact, filters 32, 33 need not be movable at all and the second end of the light guide may be moved instead since the only requirement is that there be relative motion between the end of the light guide and the filters. It is, therefore, to be understood that changes may be made in the particular embodiment as described which are within the full intended scope of the invention.

What I claim as new and desire to secure by Letters Patent of the United States is:

1. Apparatus for determining the temperature of a selected area on the surface of a body generally inaccessible to conventional temperature measuring apparatus comprising
  optical fibers means for transmitting at least a portion of the radiant energy emitted from a first surface to a hot body having the first surface and a second proximate surface respectively accessible and inaccessible to temperature measuring apparatus, said optical fiber means having a first end adjacent an area on the first surface corresponding to a selected area on the second surface but isolated therefrom the temperature of which second surface selected area is to be determined, and a second end remote from the body, the isolation of the first end of said optical fiber means from the second surface effectively shielding the optical fiber means from any contaminant which may interfere with optical transmission,
  means in optical communication with the second end of said optical fiber means for converting the radiant energy transmitted through said optical fiber means into a series of electrical pulses of first and second amplitude representing the intensity of the transmitted radiant energy in two spectral bands thereof,
  means in communication with said radiant energy converting means for separating the series of pulses into a first train of electrical pulses having the first amplitude and a second train of pulses having the second amplitude, and
  means in communication with said pulse separating means for comparing the respective amplitudes of the pulses comprising the first and second trains of pulses and obtaining a null-balanced output to thereby determine the temperature of the selected area on the second surface as a function of the ratio of the pulse amplitudes.

2. The apparatus set forth in claim 1 wherein said pulse separating means comprise
  means for generating a series of time reference electrical pulses, and
  electronic switching means responsive to the time reference pulses and the series of first and second amplitude pulses for providing the first amplitude pulse train at a first output thereof and the second amplitude pulse train at a second output thereof.

3. The apparatus set forth in claim 2 wherein said radiant energy converting means comprise
  a member provided with first and second infrared filters, said member and the second end of said optical fiber means adapted for relative motion therebetween, and
  a first photodetector means in optical alignment with said member and the second end of said optical fiber means for alternately viewing the two spectral bands of radiation transmitted through said filters and converting the alternately viewed spectral bands into the series of first and second amplitude pulses, and
  said reference pulse generating means comprise a light source and second photodetector means in optical communication with said member for generating the time reference pulses in synchronism with the series of first amplitude pulses.

4. The apparatus set forth in claim 1 wherein said pulse amplitude comparing means comprise
  electronic circuit means in communication with said pulse separating means for detecting the peak-to-peak amplitude of the pulses comprising the first and second trains of pulses,
  low pass filter means for converting the peak-to-peak amplitudes to direct current voltages having magnitudes related to the peak-to-peak amplitudes, and
  a differential amplifier circuit means for comparing the direct current voltages representing the peak-to-peak amplitudes of the first and second trains of pulses.

5. The apparatus set forth in claim 4 wherein said pulse amplitude comparing means further comprise
  means for nulling the output of said differential amplifier means to thereby determine the ratio of the peak-to-peak amplitudes of the pulses comprising the first and second trains of pulses and thereby determine the temperature of the selected area on the second surface as a function of the ratio of peak-to-peak pulse amplitudes, the distance between the first and second surfaces of the body in the region of the selected area, and the material comprising the body.

6. Apparatus for continuous fast response temperature determination of the hot spot on a cutting tool and the like comprising a cutting tool member having an external surface including a cutting edge and a small diameter hole extending into the body of said cutting tool member and terminating in close proximity with the external surface and displaced from the cutting edge, optical fiber means having a first end within the small diameter hole for transmitting at least a portion of the radiant energy emitted from the hot end surface of the small diameter hole during a cutting operation to a second end of said optical fiber means remote from the cutting tool member, detection means in optical communication with the second end of said optical fiber means for converting the radiant energy transmitted through said optical fiber means into a series of electrical pulses of first and second amplitude representing the intensity of the transmitted radiant energy in two spectral bands thereof, means in communication with said detection means for separating the series of pulses into a first train of electrical pulses having the first amplitude and a second train of pulses having the second amplitude, and means in communication with said pulse separating means for comparing the respective amplitudes of the pulses comprising the first and second trains of pulses and obtaining a null-balanced output to thereby continuously determine as a function of the ratio of the pulse amplitudes the temperature of the external surface of the cutting tool member at a small area displaced from the cutting edge which temperature represents the cutting tool hot spot.

7. The apparatus set forth in claim 6 wherein
the distance between the cutting tool member external surface including the cutting edge and the end surface of the small diameter hole within the member is in the range of 0.005 to 0.020 inch, and
the temperature of the hot spot is measured with a fast response time as low as 0.2 second.

8. The apparatus set forth in claim 6 wherein said detection means comprise
a rotating disc,
first and second infrared filters mounted on said disc, and
a first photocell in optical alignment with the second end of said optical fiber means, said disc positioned between said first photocell and second end of said optical fiber means whereby said photocell alternately views the two spectral bands of radiant energy transmitted through the first and second filters to thereby convert the two spectral bands into the series of first and second amplitude electrical pulses, and
said pulse separating means comprise
a light source,
a second photocell in optical alignment with said light source, said disc positioned between said second photocell and said light source, said disc further provided with means for intercepting the radiation from said light source to said second photocell at least once for each revolution of said disc to thereby generate a series of time reference electrical pulses in synchronism with the series of first amplitude pulses.

9. The apparatus set forth in claim 8 wherein said pulse separating means further comprise
electronic switching means responsive to the time reference pulses and the series of first and second amplitude pulses for providing the first amplitude pulse train at a first output thereof and the second amplitude pulse train at a second output thereof, and
said pulse amplitude comparing means comprise electronic circuit means in communication with said electronics switching means for detecting the peak-to-peak amplitude of the pulses comprising the first and second trains of pulses, for converting the peak-to-peak amplitudes to direct current voltages, for comparing the direct current voltages, and for obtaining a null-balanced output of the direct current voltages.

References Cited

UNITED STATES PATENTS

| | | | |
|---|---|---|---|
| 2,927,502 | 3/1960 | Watrous | 73—355 |
| 3,051,035 | 8/1962 | Root | 356—44 |

OTHER REFERENCES

"Temperature Field of a Turning Tool and the Reactions in the Zone of Contact" by Dr. Opity; an article found in Micrtecnic, vol. VIII, No. 4 of the International Institute for Production Engineering Research, pp. 183–190, dated in the Patent Office Library Oct. 8, 1954.

LOUIS R. PRINCE, Primary Examiner

DENIS E. CORR, Assistant Examiner

U.S. Cl. X.R.

73—355